United States Patent [19]

Balch et al.

[11] 4,280,614

[45] Jul. 28, 1981

[54] SYSTEM FOR OFFLOADING ARTICLES FROM A CONVEYOR BELT

[75] Inventors: James L. Balch; James E. Anderson; Boleslaus J. Sadeski, all of Madison, Wis.

[73] Assignee: Oscar Mayer & Company, Inc., Madison, Wis.

[21] Appl. No.: 18,151

[22] Filed: Mar. 7, 1979

Related U.S. Application Data

[60] Continuation of Ser. No. 848,478, Nov. 4, 1977, which is a continuation of Ser. No. 639,420, Feb. 10, 1975, which is a division of Ser. No. 447,354, Mar. 1, 1974, Pat. No. 3,934,705.

[51] Int. Cl.³ ............................................. B65G 47/26
[52] U.S. Cl. .................................. 198/425; 271/256; 271/270
[58] Field of Search ............... 198/425, 460, 423, 414; 271/270, 256; 93/93 C

[56] References Cited

U.S. PATENT DOCUMENTS 3,373,666  3/1968  Crampton .................... 271/256 X

FOREIGN PATENT DOCUMENTS

1001991  8/1965  United Kingdom .................... 149/425

Primary Examiner—Robert B. Reeves
Assistant Examiner—Douglas D. Watts
Attorney, Agent, or Firm—Lockwood, Dewey, Alex & Cummings

[57] ABSTRACT

A product grouping station in a system for offloading bacon strips or the like comprises hydraulically-actuated lifters which lift groups of the bacon strips clear of the unidirectionally driven conveyor as they proceed away from the transfer station, and then release the groups in time sequence to achieve separation on the conveyor. The product grouping station is particularly adapted to handling thin strip-like products such as bacon slices, and employ novel control circuitry to obtain a continuous uniform operation for the offloading system which does not interfere with the operation of the continuously moving conveyor belt.

5 Claims, 11 Drawing Figures

SYSTEM FOR OFFLOADING ARTICLES FROM A CONVEYOR BELT

This is a continuation of application Ser. No. 848,478, filed Nov. 4, 1977, which is a continuation of Ser. No. 639,420, 2/10/75, which is a division of Ser. No. 447,354, 3/1/74, now U.S. Pat. No. 3,934,705.

BACKGROUND OF THE INVENTION

The present invention relates generally to transfer systems, and more specifically to an offloading system for removing strip-like products such as sliced bacon arranged side-by-side from a first unidirectionally driven conveyor, and for rearranging the products in predetermined serial groupings on a second conveyor. The system finds particular utility for offloading fried bacon strips from the endless conveyor of a bacon frying oven, and for shingling the off-loaded bacon strips in predetermined groups for packaging.

Bacon frying ovens of the type to which the present invention is particularly adapted employ a wide continuously moving conveyor belt on which bacon strips are arranged side-by-side in transverse rows. As the bacon strips progress through the oven a second continuously moving belt is brought down on top of the bacon slices. The two belts, with the bacon strips pressed flat inbetween, are driven between heated platens which simultaneously apply pressure and heat to fry the bacon strips. After the bacon strips have been fried the second belt is removed to enable the bacon strips to be removed from the conveyor belt.

For efficient operation of such bacon frying ovens it is necessary that the bacon strips be arranged to provide maximum utilization of the conveyor belt surface. That is, the bacon strips must not be so close together as to stick together during the frying operation, or so far apart as to cause large areas of the belts to be heated and pressed with no bacon strips therebetween. Accordingly, it has become standard practice to arrange the bacon strips lengthwise side-by-side in transverse rows extending across the entire width of the belt, the transverse rows being equally spaced along the entire length of the top surface of the conveyor belt. Furthermore, since the oven platens must necessarily be continuously heated and short term temperature changes are not practicable it is highly desirable for consistent frying action that the fryer oven conveyor move continuously at a predetermined constant speed.

The need for loading and offloading bacon strips from the oven conveyor without interfering with the operational efficiency of the oven has presented a need for loading and unloading systems capable of automatically handling the thin strips of bacon with a high degree of precision and in a manner which interfaces with the cyclic operation of up-line and down-line processing machinery. The co-pending application of the present inventors, Ser. No. 447,392, filed Mar. 1, 1974 and assigned to the present assignee, is directed to a system meeting these criteria which is eminently well suited for loading the oven conveyor with limp unfried bacon slices, and the present application is directed to a system meeting these criteria for offloading prefried bacon slices from the oven conveyor.

Accordingly, it is an object of the present invention to provide a system for grouping a finite number of items serially arranged on a unidirectionally-driven conveyor into individual groups each having a predetermined number of items.

It is another object of the present invention to provide a system for grouping items serially arranged along a continuously moving conveyor into groups having a predetermined number of items each, and for shingling the items in each group and depositing the shingled groups onto underlying parchment paper for subsequent packaging.

SUMMARY OF THE INVENTION

The invention is directed to a product grouping system for dividing a finite number of items serially spaced along a unidirectionally driven conveyor into first and second groups of first and second predetermined numbers of items, respectively. The system comprises a first product retardation means responsive to an applied control effect for lifting a first group of items corresponding in number to the second predetermined number clear of the conveyor as they immmediately precede a reference point along the conveyor, and control means for actuating the product retardation means for a predetermined period of time after a group of items corresponding in number to the first predetermined number of items has advanced past the reference point to cause the group of items immediately ahead of the reference point to be separated from the group of items immediately behind the reference point by the motion of the conveyor.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
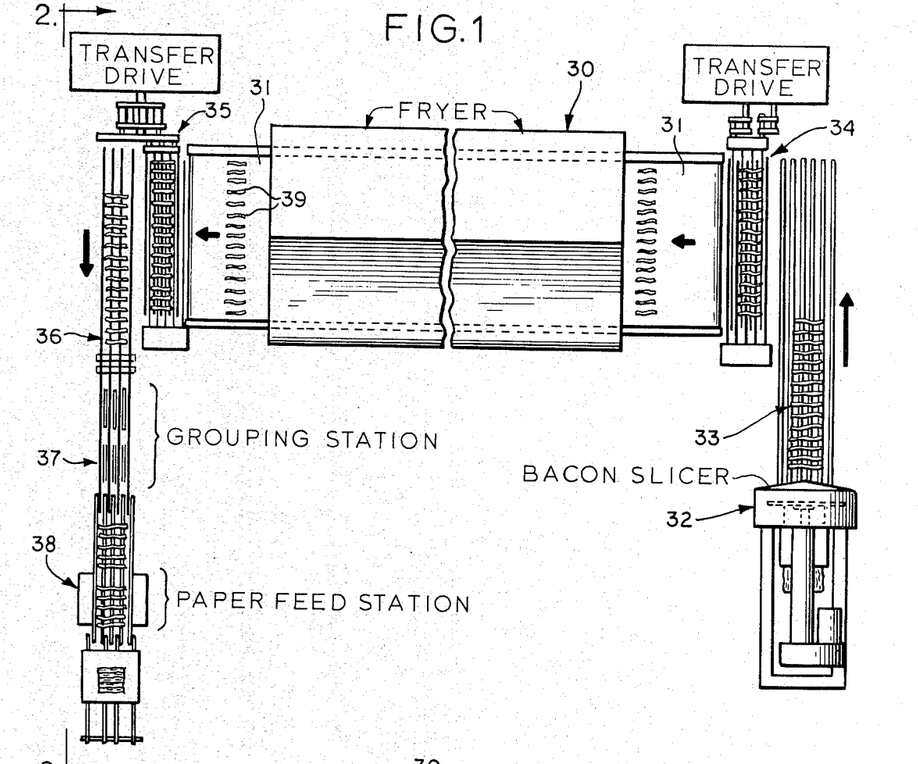
FIG. 1 is a top plan view, partially diagrammatic, of a bacon fryer oven and the loading and offloading systems associated therewith.

Referring to FIG. 1, an offloading system constructed in accordance with the invention is shown in connection with a bacon frying oven 30, which may be conventional in design and construction. Basically, oven 30 comprises a horizontal continuous conveyor belt 31 which is unidirectionally driven to transport bacon strips through the oven. To facilitate this function, the conveyor belt 31 may be coated with Teflon or have a similar non-adhesive surface to prevent the bacon strips from sticking to the belt. A second unidirectionally driven continuous conveyor belt (not shown) is brought into engagement with belt 31 within the bacon fryer oven to press the bacon strips flat during the frying operation. While the bacon strips are being held flat between the two conveyor belts the belts pass between heated platens (not shown) which simultaneously apply heat and pressure to fry the bacon.

The bacon frying oven 30 has at its input end a loading system which includes a bacon slicer 32, a unidirectionally driven conveyor 33 for conveying the bacon slices from the slicer 32, and a transfer carriage assembly 34 for transferring the bacon slices from a serial arrangement on conveyor 33 to a side-by-side arrangement of equi-spaced transverse rows on the oven conveyor belt 31. The details of this loading system are covered in the aforementioned application of the present inventors, Ser. No. 447,392.

Figure 2:
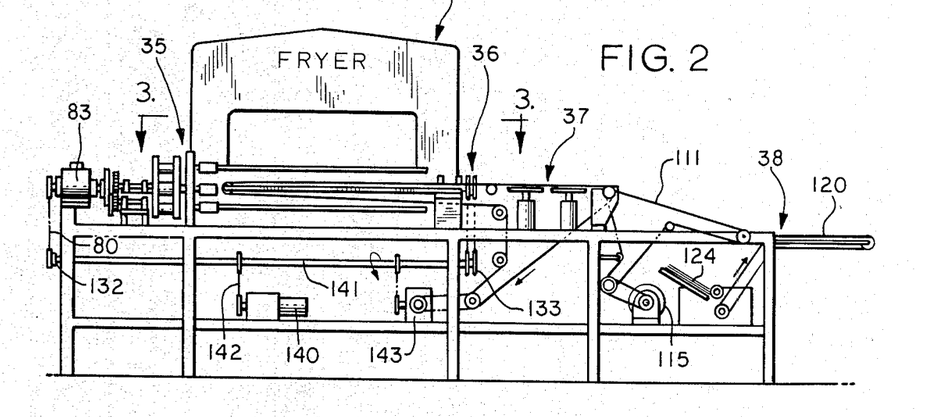
FIG. 2 is a front elevational view of the offloading system of FIG. 1 taken along line 2—2 of FIG. 1.

Referring to FIGS. 1 and 2, the offloading system provided at the output end of oven 30 comprises a product transfer station 35 for transferring the fried bacon strips from the oven conveyor belt 31, on which they are arranged side-by-side, to a serial arrangement on a unidirectionally drivven transfer conveyor 36 extending at a right angle to the oven conveyor 31. Conveyor 36 conveys the bacon strips to a product grouping station 37 wherein the bacon strips are rearranged into groups each having a predetermined number of bacon strips. The grouped bacon strips then proceed to a sheet feeding station 38 wherein the groups are arranged on underlying sheets of parchment paper or the like for subsequent packaging.

Figure 3:
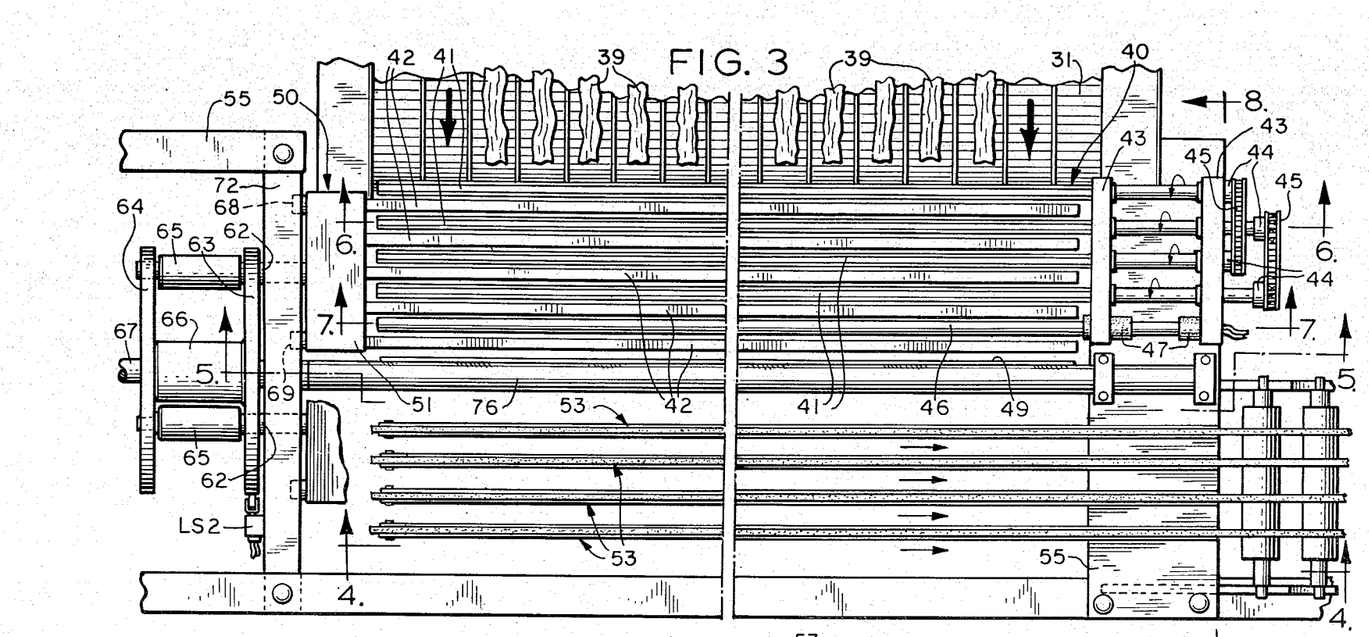
FIG. 3 is an enlarged top plan view, partially fragmented, of the product transfer apparatus employed in the offloading system shown in FIG. 2.
Figure 6:
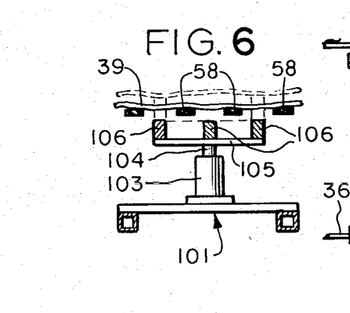
FIG. 6 is a cross-sectional view taken along line 17—17 of FIG. 5 showing the product retardation means utilized in the product grouping station.
Figure 8:
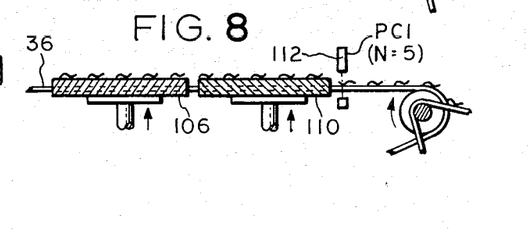
FIG. 8 is a diagrammatic illustration of the product retardation means in a second portion of their operating cycle.
Figure 9:
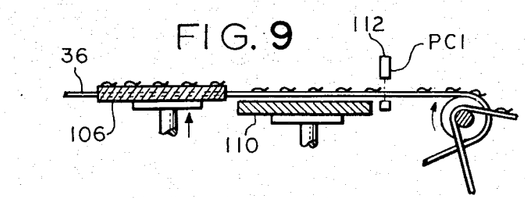
FIG. 9 is a diagrammatic illustration of the product retardation means in a third portion of their operating cycle.
Figure 10:
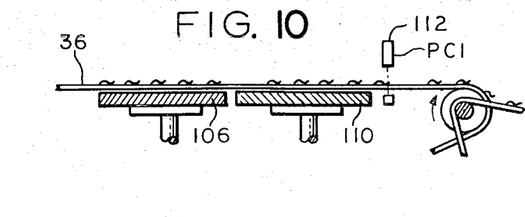
FIG. 10 is a diagrammatic illustration of the product retardation means in a fourth portion of their operating cycle.

The components and mechanism of the product transfer station 35 is shown in FIG. 3, wherein a plurality of bacon strips 39 are shown at the discharge end of the oven conveyor 31. As the bacon strips 39 leave conveyor 31 they transfer onto a horizontal carriage loading platform 40 formed by four parallel spaced-apart six-sided support rods 41 and a product sensing rod 46. Five parallel four-sided support members 42 are positioned between the support rods 41, the rods 41 and members 42 extending transversely to conveyor 31 and in a horizontal plane so as to form with the oven conveyor 31 a contiguous transfer path for the bacon strips 39. As shown in FIGS. 6 and 8, the support rods 41 are cantilevered, being journaled at one end to a pair of laterally spaced support blocks 43 attached to the frame of the transfer apparatus. To convey or transfer the bacon strips forwardly onto platform 40 the support rods 41 are rotatably driven at equal angular speeds by means of sprockets 44 carried on the support ends thereof and a pair of drive chains 45. As the bacon strips 39 are conveyed away from conveyor 31 by support rods 41 they pass over support members 42, which are disposed between the support rods 41 to bridge the gaps therebetween. The bacon strips continue to advance until their leading edges abut a transversely extending stop plate 49.

Figure 7:
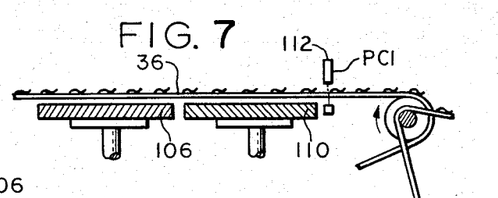
FIG. 7 is a diagrammatic illustration of the product retardation means in a first portion of their operating cycle.

The product sensing rod 46 is disposed between the last two support members 42 of the carriage loading platform to sense when the bacon strips 39 have advanced completely onto the platform. As shown in FIG. 7, product sensing rod 46, like support rods 41, is supported at one end from the spaced-apart blocks 43. However, sensing rod 46 is not rotatably driven, and is insulated from blocks 43 by a pair of insulated bushings 47, which may be formed of ceramic or other suitable non-conductive material. As the bacon strips progress across the platform 40 their leading edges eventually touch sensing rod 46, and in so doing establish an electrical circuit between rod 46 and a preceding support member 42 or rod 41. As will be seen presently, this initiates a transfer cycle which removes the bacon strips from the carriage loading platform 40.

The bacon strips 39 are lifted clear of the carriage loading platform 40 by a product transfer carriage 50 (FIG. 3), which comprises the support members or rods 42 and a carriage support block 51 to which the support mebers 42 are attached at one end. In practice, three such transfer carriages 50 are included in product transfer station 35, the support members 42 of each being successively passed between the cantilevered support rods 41 and the sensing rod 46 of the carriage loading platform 40. Since the three transfer carriages are identical, the structure and operation of only one such transfer carriage will be described, it being understood that the description pertains to all three.

Figure 4:
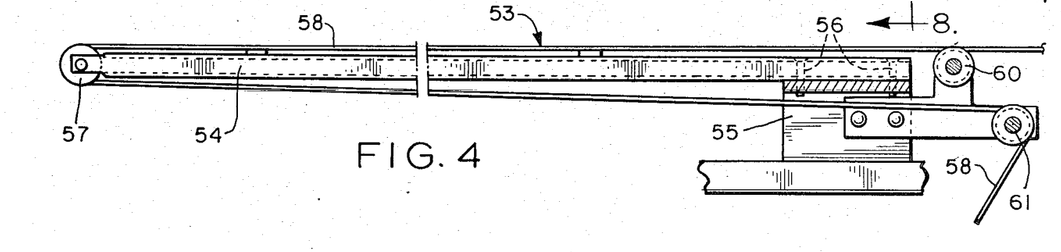
FIG. 4 is a sectional view taken along line 4—4 of FIG. 3 showing one of the cantilevered conveyor belt assemblies incorporated in the product transfer apparatus.
Figure 5:
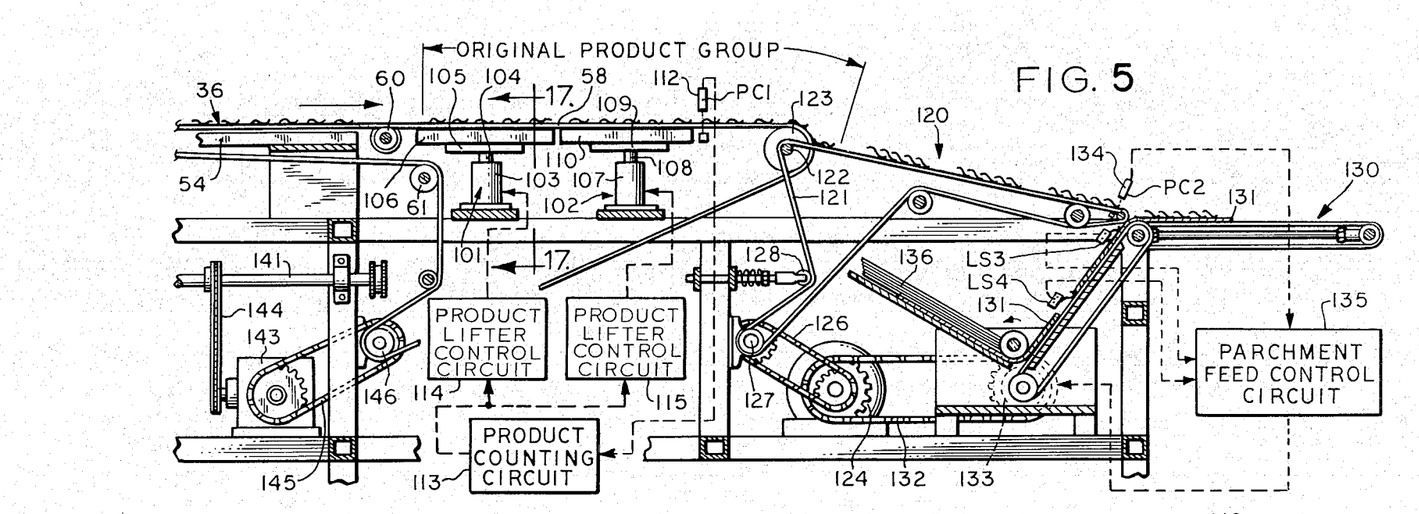
FIG. 5 is a side elevational view, partially diagrammatic and partially in functional block form, of the product grouping, shingling and parchment feed stations of the offloading system.

It is the function of the transfer carriage 50 to convey the bacon strips 39 on carriage loading platform 40 to a carriage offloading platform 52 (FIGS. 1 and 15), wherein the five product support members 42 of the carriage pass between four parallel spaced-apart cantilevered conveyor belt assemblies 53. Each of these conveyor belt assemblies 53 is seen in FIGS. 4 and 15 to comprise a cantilevered support beam 54 which is attached at one end to the frame 55 of the transfer apparatus by machine screws 56 or other appropriate means, and which is bifurcated at its other end to support a pulley 57. A belt or tape 58 is reeved over pulley 57 and extends back along the top and bottom edges of support beam 54 to upper and lower guide pulleys 60 and 61, respectively. The cantilevered conveyor belt assemblies 53 collectively form offloading platform 52, which serves to remove bacon strips from each transfer carriage 50 for conveyance to the product grouping station 37 by conveyor 36.

The three product transfer carriages 50 of the product transfer station 35, henceforth termed the "A", "B" and "C" carriages, are mounted on individual support shafts 62 spaced 120° apart on the support flanges 63 and 64. Referring to FIG. 13, when the product transfer station 35 is not in operation, one of the transfer carriages 50 is aligned at a home position between support rods 41 to facilitate conveyance of the bacon strips 39 onto the carriage loading platform 40. In FIG. 13 the "A" carriage is shown in the home position, and strips of bacon 39" are being conveyed onto the carriage loading platform 40 from the oven conveyor 31. The "B" carriage is stationary at a position 120° advanced along the operating path carrying strips of bacon 39' previously picked up from platform 40. In operation, when the bacon strips 39" advance sufficiently to bridge the product sensor rod 46 and the adjacent support rod 41, an electrical circuit is completed and after a predetermined time delay sufficient to allow the bacon strips to advance against stop plate 49, the three product transfer carriages 50 are each advanced one-third of the way around their circular path. As shown in FIG. 14, this causes the "B" carriage to deposit bacon strips 39' onto the carriage offloading platform 52, formed by the cantilevered conveyor belt assemblies 53. The "B" carriage continues to advance to the position previously occupied by the "C" carriage, the "C" carriage advances to the home position previously occupied by the "A" carriage, and the "A" carriage advances to the position previously occupied by the "B" carriage. At the completion of the cycle the "A" carriage holds the bacon strips 39", and upon initiation of the next transfer cycle as bacon strips 39''' come into position the "A" carriage will offload bacon strips 39" onto the offloading station 52 formed by cantilevered conveyor assemblies 53.Thus, each transfer cycle results in a 120° C. advance of the product transfer conveyors, and two such transfer cycles result in the incoming bacon slices being transferred from a side-by-side configuration on the bacon fryer conveyor 31 to a serial spaced configuration on the cantilevered conveyor assemblies 53.

The bacon strips or slices 39 deposited by the product transfer carriage 50 on the four cantilevered conveyor belt assemblies 53 are conveyed by the conveyor belts 58 of these assemblies away from the transfer carriage off-loading platform 52. The conveyor belts 58, as they extend in parallel spaced relationship beyond the cantilevered belt assemblies 53, together forms conveyor 36, which it will be recalled conveys the bacon strips 39 to the product grouping station 37. It will be appreciated that at this point the bacon strips 39 are arranged serially on conveyor 36 in groups each consisting of a finite number of strips equal to the number of strips present in each transverse row in the oven conveyor 30. In the present example each row consists of fifteen bacon strips, and accordingly, the groups serially advancing along conveyor 36 each consist of fifteen strips.

It is often desirable that the groups of bacon strips formed on conveyor 36 by the product transfer station 35 be divided into smaller groups for more convenient packaging. To this end the product grouping station 37 of the illustrated offloading system is provided with a grouping system comprising first and second product retardation means in the form of hydraulically actuated rails or lifter assemblies 101 and 102 (FIG. 16). When actuated, these assemblies retard or detain that portion of the group of bacon strips than overlying the assembly on conveyor 36. As shown in FIG. 17, the first hydraulic lifter assembly 101 comprises a hydraulic cylinder 103 having an upwardly extending actuator arm 104. The top end of the actuator arm 104 is attached to a carriage 105 which extends transversely beneath. Three longitudinally extending product lifter rails 106 are mounted edge-wise on carriage 105 so as to extend between the individual conveyor belts 58 of conveyor 36 when the hydrualic cylinders are actuated. As shown in FIG. 17, this has the effect of lifting a strip of bacon 39 clear of the conveyor belt surface, thereby detaining or retarding the bacon strip. The number of bacon strips retarded for a given strip-to-strip spacing is dependent on the length of product support rails 106, and can be varied by the user by making an appropriate adjustment in the length of this rail. The second hydraulic lifter assembly 102 is identical in structure to the first lifter assembly 101, comprising a hydraulic cylinder 107, an actuator arm 108, a carriage 109, and three product lifter rails 110.

The operation of the two hydraulic lifter assemblies is controlled by means of a product detector 112, a counter 113, and two product lifter control circuits 114 and 115. Product detector 112, in this instance a photocell positioned immediately down-line of lifter rail 110, is adapted to sense the passage of the bacon strips 39 at that reference point. Each such passage produces an output signal which steps counter 113, and when counter 113 reaches a predetermined count it produces a control signal which is simultaneously applied to the two product lifter control circuits 114 and 115. These circuits, control appropriate hydraulic circuitry, to actuate respective ones of hydraulic cylinders 103 and 107 for predetermined periods of time.

The operation of the product grouping system is illustrated diagrammatically in FIGS. 18-21, wherein the product grouping system has been set up to divide an original group of fifteen bacon strips into three equal groups of five bacon strips each. To this end, the lengths of the product support rails 105 and 106 have been adjusted so that each detains or retards five strips of bacon, and the product sensor 112 has been positioned to sense the passage of bacon strips at a reference point immediately down line of lifter rail 109, as shown in FIG. 18. Counter 113 is set to generate an output signal when the number of bacon strips desired in the first of the three product groups, in this case five, has passed the reference point. The output signal from counter 113 is applied to the first and second product lifter control circuits 114 and 115, which immediately actuate the hydraulic cylinders 103 and 107 upon receipt of the control signal from counter 113, causing the bacon strips then overlying rails 106 and 110 to be lifted clear of conveyor belt 36 as shown in FIG. 19.

Control circuit 115 actuates cylinder 107 for a first predetermined period of time, and then releases it, allowing the bacon strips 39 lifted by rail 110 to again be conveyed by conveyor 36, as shown in FIG. 20. Since conveyor belt 36 continued to move during the period cylinder 107 was actuated, a space is developed between the bacon strips in the first group, i.e. those counted by detector 112, and those in the second group, i.e. those lifted by rail 110. Control circuit 114 energizes cylinder 103 for a second and slightly longer predetermined period before releasing the bacon strips lifted by support rail 106 onto conveyor 36. As a result, these bacon strips are formed into a third group spaced on conveyor 36 from the second group previously formed by the operation of cylinder 107, as shown in FIG. 21. Thus, three distinct groups of bacon strips are formed on the continuously moving conveyor belt 36.

It will be appreciated that while solenoid-controlled hydraulic cylinders have been shown as the product retardation means, it would also be possible to accomplish the same result by means of electromagnetic or pneumatic actuator. Furthermore, it will be appreciated that other lifting structures can be utilized for the product support rails 105, other types of product detectors 112 can be employed, and that the predetermined maximum counting state of counter 107 and the relative length of the product support rails 105 and 106 can be changed to segregate the bacon strips into groups of unequal size, should this be desirable in the packaging operation. Furthermore, it is contemplated that the product detector 112 could be placed at a predetermined distance down line of lifter rail 110 to detect the lead bacon slice as the first group to be segregated has cleared rail 110, thereby obviating the need for counting the strips as they pass rail 110.

The bacon strips 39, having been segregated into uniform groups, are next shingled in preparation for packaging. The shingling operation is accomplished in a conventional manner by transferring the serially arranged bacon strips from conveyor 36 onto a slower moving shingling conveyor 120. To this end, conveyor 120 comprises five unidirectionally driven conveyor belts 121 which are routed around pulleys 122 co-axial with the end pulleys 123 of conveyor 36. As a result, each bacon strip 39 carried by conveyor 36 is transferred from conveyor 36 to conveyor 120, and because of the slower speed of conveyor 120 the strips are caused to partially overlap. To permit the speed of conveyor 120 to be independently adjusted from that of conveyor 36, conveyor 120 is powered by an independent power source in the form of a motor 124. Motor 124 is coupled by a chain 125 to a drive shaft assembly 127 from which the individual belts 121 of conveyor 120 are powered. A spring-loaded belt follower pulley 128 is provided on each conveyor belt to maintain tension.

Conveyor 120 is arranged with a slight downward incline to feed onto a parchment sheet feed conveyor 130. Conveyor 130 comprises part of a parchment feed system for introducing individual sheets 131 of parchment paper beneath the groups of shingled bacon strips on conveyor 120 to facilitate subsequent packaging. To this end, the parchment feed conveyor 130 is powered from motor 124 by means of a chain 132 and an electrically actuated clutch 133 so that its motion can be selectively started and stopped as each successive group of shingled bacon strips advances into position. A product sensor 134 in the form of a photo-detector PC-2 is provided to detect the lead bacon strip in each such group, and the output of this detector is applied to a parchment feed control circuit 135 which provides appropriate signals for controlling the operation of clutch 133. To insure that the individual sheets 131 of parchment paper are properly positioned, a pair of limit switches LS3 and LS4 are provided to sense the positioning of the lead sheet 131' of parchment paper. A stack 136 of parchment paper may be provided at the bottom end of conveyor 130 as a source of successive sheets of parchment paper.

Two modes of operation for the parchment feed conveyor system are available. In a first or so-called single start mode a single sheet 131 of parchment paper is advanced by conveyor 130 until its leading edge is detected by limit switch LS3. At that point the conveyor 130 is stopped until the lead strip of a group of shingled bacon strips is detected by detector PC-2, at which time conveyor 130 is started and the product group is deposited on the advancing sheet of parchment paper. In a second or double-start mode a sheet 131 of parchment paper is also advanced until limit switch LS3 is actuated, at which time the parchment feed conveyor 130 is stopped. However, the first product group detected by detector PC-2 causes conveyor 130 to advance the sheet 131 of parchment paper approximately half its length, or until the trailing edge of the parchment paper clears limit switch LS4. The first product group is therefore received on the first half of the parchment paper. Upon detection of the next succeeding product group, conveyor 130 is again advanced so that the second product group is deposited on the second half of the sheet 131. The conveyor 130 then continues to run until the sheet 131 clears and a second sheet 131 of parchment paper is moved into the loading position, as detected by limit switch LS3. In this way two product groups are deposited on a single sheet of parchment paper.

As shown in FIG. 2, conveyor 36 and the product transfer carriages 50 are powered by means of a motor 140 and a horizontal longitudinally extending shaft 141, which is coupled to motor 140 by a chain 142. Singling conveyor 120 is powered by means of a right angle drive 143, which is coupled to drive shaft 141 by a chain 144 and to conveyor 120 by means of a chain 145 and a conveyor drive roller assembly 146.

Figure 11:
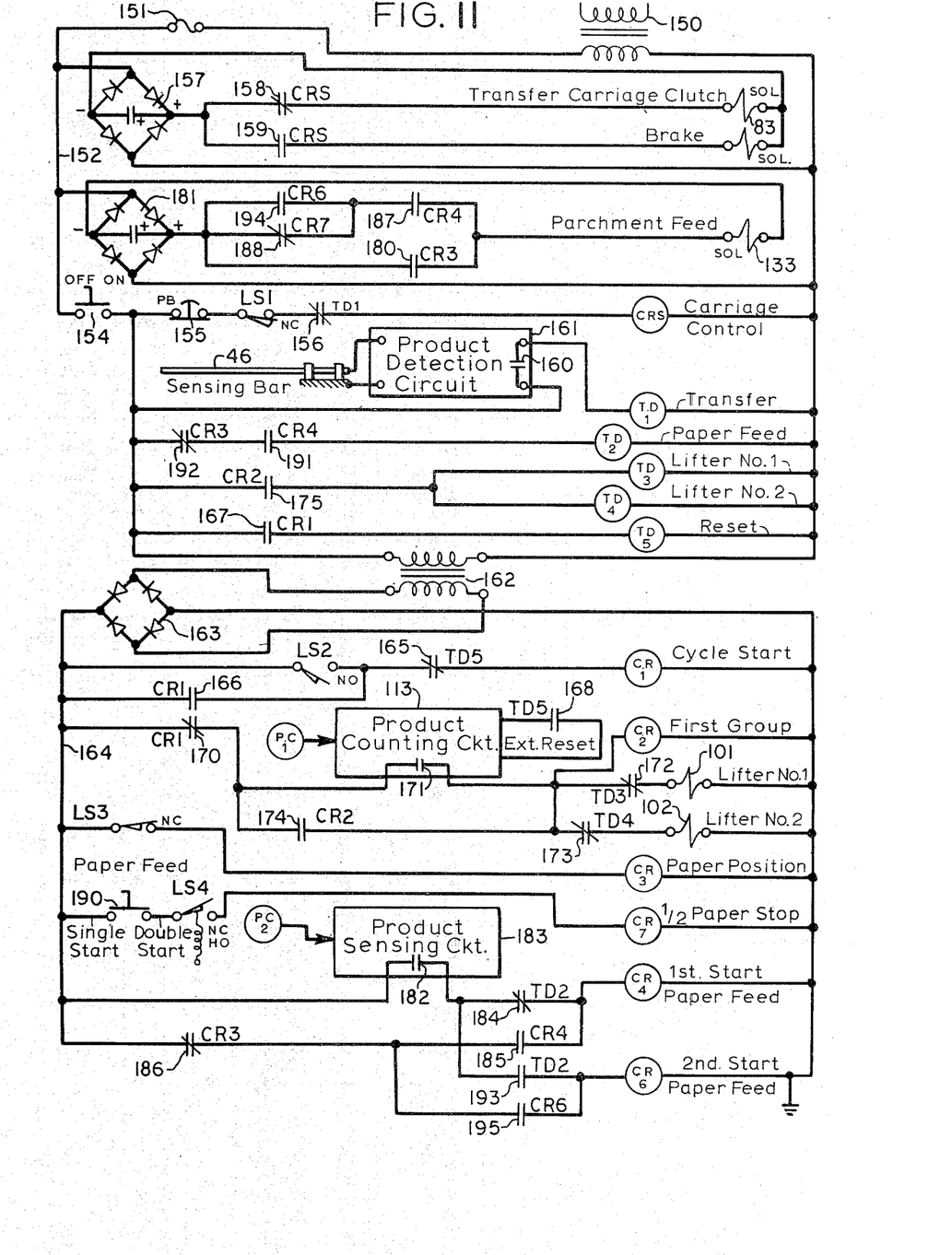
FIG. 11 is a simplified schematic diagram of the electrical control circuit of the offloading system.

A simplified schematic diagram for the electrical control circuits of the offloading system is shown in FIG. 22. The secondary winding of an isolation transformer 150 is connected through a fuse 151 to a supply bus 152 which supplied AC current to individual circuits of the system control circuit.

Cycling of the transfer carriages 50 in the product transfer station 35 is controlled by relay CRS, which is supplied from bus 152 through an ON-OFF switch 154, a normally-closed MANUAL CYCLE push button switch 155, the normally-closed carriage indexing limit switch LS1, and the normally-closed contacts 156 of a time delay relay TD1. Supply bus 152 is also connected to a bridge rectifier network 157 which supplies direct current through the normally-closed contacts 158 of relay CRS to the clutch solenoid of the transfer carriage control clutch 83, and through the normally-open contacts 159 of relay CRS to the brake solenoid of clutch 83. Upon de-energization of control relay CRS, either by actuation of MANUAL CYCLE push button 155, or by operation of the relay TD1, clutch 83 is engaged and the product transfer station 35 is caused to cycle. Relay TD1 is powered through the normally-open contacts 160 of a product detection circuit 161, which may comprise a conventional resistance bridge and amplifier adapted to respond to the resistance between the product sensing bar 46 and the adjacent product support members 42 to detect the presence of bacon strips at the carriage loading station 40. Upon detection of bacon strips at sensing bar 46 contacts 160 close and cause time delay relay TD1 to be actuated, thus de-energizing carriage control relay CRS and causing clutch 83 to cycle the transfer carriages through 120°. A short predetermined time delay is established by relay TD1 to enable the bacon strips to completely advance onto the carriage loading platform 40 until they abut stop plate 49 before the transfer carriages are cycled. Limit switch LS1 causes the carriages to continue to rotate until they complete their 120° cycle, i.e. until the geneva drive gear 85 has completed one complete half revolution.

Bus 152 also powers a step-down transformer 162, which provides a lower AC voltage to a bridge rectifier 163. The low voltage direct current from this rectifier is applied to a bus 164, which supplies a portion of the system control circuits.

Operation of the product grouping station 37 is initiated by limit switch LS2, which is positioned adjacent the operating path of the product transfer carriages 50 so as to be momentarily actuated during each transfer cycle. Actuation of limit switch LS2 causes the cycle start relay CR1 to be actuated through the normally-closed contacts 165 of time delay relay TD5. Once actuated, relay CR1 is maintained energized by its own holding contacts 166. The actuation of relay CR1 also closes contacts 167, allowing time delay relay TD5 to energize after a predetermined delay period. When this relay energizes product counting circuit 113, which it will be recalled produces an output when a predetermined number of bacon strips have passed detector PC1, is reset to a zero counting state by contacts 168.

The energization of time delay relay TD5 also results in contacts 165 opening, causing relay CR1 to be de-energized. This causes contacts 170 to close, so that when a sufficient number of bacon strips have passed detector PC1 to cause product counting circuit 113 to produce an output, and the internal contacts 171 of that circuit close, the first and second product retardation lifters 101 and 102 are energized through normally-closed contacts 172 and 173 of time delay relays TD3 and TD4, respectively. Control relay CR2 is also energized, closing holding contacts 174 to maintain the lifters energized, and closing contacts 175 to apply power to time delay relays TD3 and TD4. These relays independently close after a predetermined period of time, causing contacts 172 and 173 to sequentially open to sequentially release the first and second product lifters 101 and 102. Thus, the desired product grouping action is obtained.

Paper is positioned on the paper feed conveyor 130 by limit switch LS3, which remains closed and causes relay CR3 to be energized until a sheet 131 of parchment paper is fed into position. Energization of relay CR1 causes closure of contacts 180, which allows the DC output of a bridge rectifier network 181 supplied by bus 153 to energize the control solenoid of the parchment feed conveyor clutch 133 until the paper is positioned. The paper feed cycle is initiated by detection of a group of bacon strips by detector PC2, which results in the closure of contacts 182 in a conventional photodetector amplifier circuit 183 associated with photodetector PC2. This causes relay CR4 to be energized through the normally-closed contacts 184 of time delay relay TD2, which is maintained energized by its holding contacts 185 through normally-closed contacts 186 of relay CR3. The energization of relay CR4 causes contacts 187 to close, applying direct current from bridge rectifier network 181 through the normally-closed contacts 188 to relay CR7 to the control solenoid of parchment feed control clutch 133. As a result, paper is fed by conveyor 130 to receive a first group of shingled bacon slices. In the first or single-start mode of the paper feed system, the paper continues to feed until it runs out and another sheet is brought into position so as to open limit switch LS3, which again causes control relay CR3 to be energized and contacts 180 to supply power to the paper feed clutch solenoid. In the second or double start mode of the paper feed conveyor system, mode selector switch 190 is closed so that relay CR7 will be energized when the paper is advanced to an intermediate position. This opens normally-closed contacts 188 to stop conveyor 130 with the sheet 131 of parchment paper positioned half way along the conveyor. Time delay relay TD2 is energized through contacts 191 and the normally-closed contacts 192 of relay CR3 at this time by reason of relay CR4 being energized. The energization of relay TD2 closes contacts 193 so that when the next group of bacon slices is detected by sensing circuit 183 and contacts 182 close, relay CR6 is energized. This causes contacts 194 to close, supplying power to the control solenoid of the parchment conveyor clutch 133 and advancing the paper to receive the second group of bacon strips. Contacts 195 hold relay CR6 energized through contacts 186 of relay CR3 curing this period. As before, the paper then continues to feed until another sheet of parchment paper opens limit switch LS3.

Thus, a system has been shown and described for removing strip-like products such as bacon slices from a side-by-side arrangement on the continuously moving conveyor belt of a bacon frying oven, and for rearranging these bacon slices in shingled groups on individual sheets of parchment paper. The transfer process is continuous and accurate, and in no way interferes with the continuous operation of the oven conveyor belt.

While a particular embodiment of the invention has been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A product grouping system for dividing a finite number of items having a predetermined serial spacing along a continuously moving unidirectionally driven conveyor into first and second serially spaced groups of first and second predetermined numbers of items, respectively, having said predetermined spacing on said conveyor, said system comprising, in combination:

product detector means fixedly positioned at a reference point along said conveyor for producing an output signal upon the passage of each of said items at said reference point on said conveyor;

product retardation means fixedly positioned relative to said direction of conveyor movement and responsive to an appied control effect for lifting said second predetermined number of items clear of said conveyor immediately preceding said reference point while maintaining said predetermined spacing between said items; and control means reponsive to said detector output signal for actuating said product retardation means for a predetermined period of time following the passage of said first predetermined number of items at said reference point to cause said items immediately ahead of said reference point to be separated from said items immediately behind said reference point by the motion of said conveyor to form said first and second groups of items having said predetermined spacing between items.

2. A product grouping system as defined in claim 1 wherein said conveyor comprises a plurality of parallel spaced-apart conveyor belts, and said retardation means comprise at least one retractable support rail disposed between said conveyor belts and adapted to extend from a retracted position beneath the conveying surface of said belts to an extended position above and substantially parallel to said conveying surface whereby said items are lifted clear of said conveying surface and held stationary with respect to said conveyor.

3. A product grouping system for dividing a finite number of items having predetermined spacing along a continuously moving unidirectionally driven conveyor into first, second and third serially spaced groups of first, second and third predetermined numbers of items, respectively, having said predetermined spacing on said conveyor, said system comprising, in combination:

first product retardation means fixedly positioned with respect to said direction of conveyor movement and responsive to an applied control effect for lifting said second predetermined number of items clear of said conveyor immediately preceding a reference point along said conveyor while maintaining said predetermined spacing between said items;

second product retardation means fixedly positioned with respect to said direction of conveyor movement and responsive to an applied control effect for lifting said third predetermined number of items clear of said conveyor immediately preceding said first product retardation means while maintaining said predetermined spacing between said items; and control means responsive to the number of said items passing beyond said reference point for simultaneously actuating said first and second product retardation means when said first predetermined number of items have advanced past said reference point, and for releasing said first product retardation means after a first period of time, and for releasing said second product retardation means after a second period of time longer than said first period of time to cause said items to be separated into said first, second and third serially spaced groups by the motion of said conveyor.

4. A product grouping system as defined in claim 3 wherein said conveyor comprises a plurality of parallel spaced-apart conveyor belts, and said retardation means each comprise at least one retractable support rail disposed between said conveyor belts and adapted to extend from a retracted position beneath the conveying surface of said belts to an extended position above and substantially parallel to said conveying surface whereby said items are lifted clear of said conveying surface and held stationary with respect to said conveyor.

5. A product grouping system for dividing a finite number of items having a predetermined serial spacing along a continuously moving unidirectionally driven conveyor into first, second, and third serially spaced groups of first, second, and third predetermined numbers of items, respectively, having said predetermined spacing on said conveyor, said system comprising, in combination:

first product retardation means fixedly positioned relative to said direction of conveyor movement and responsive to an applied control effect for lifting said second predetermined number of items clear of said conveyor immediately preceding a reference point along said conveyor while maintaining said predetermined spacing between said items;

second product retardation means fixedly positioned relative to said direction of conveyor movement for lifting said third predetermined number of items clear of said conveyor while maintaining said predetermined spacing between said items;

control means responsive to said first predetermined number of items having passed said reference point for actuating said first and second product retardation means, said first retardation means being actuated for a first predetermined period of time, and said second product retardation means being actuated for a second predetermined period of time greater than said first predetermined period of time, whereby said items immediately ahead of said reference point are separated from said items immediately behind said reference point by the motion of said conveyor to form said first group, and said items lifted clear of said conveyor by said first retardation means are separated from said items lifted clear of said conveyor by said second retardation means by the motion of said conveyor to form said third group.

* * * * *

UNITED STATES PATENT AND TRADEMARK OFFICE
CERTIFICATE OF CORRECTION

PATENT NO. : 4,280,614
DATED : July 28, 1981
INVENTOR(S) : James L. Balch et al

It is certified that error appears in the above-identified patent and that said Letters Patent are hereby corrected as shown below:

Col. 3, line 41: "drivven" should be --driven--.

Col. 6, line 62: "actuator" should be --actuators--.

Col. 9, line 35: "153" should be --152--.

Col. 10, line 6: "curing" should be --during--.
line 39: "appied" should be --applied--.

Signed and Sealed this

Twelfth Day of January 1982

[SEAL]

Attest:

GERALD J. MOSSINGHOFF

Attesting Officer     Commissioner of Patents and Trademarks